US012629721B2

(12) United States Patent
Barberi et al.

(10) Patent No.: US 12,629,721 B2
(45) Date of Patent: *May 19, 2026

(54) CRYOGENIC PROCESSING SYSTEM FOR PLANT MATERIAL

(71) Applicant: AGT-USA, Inc., Corona, CA (US)

(72) Inventors: Steven J. Barberi, Corona, CA (US); Gregory J. Gruzdowich, Corona, CA (US); Louis J. Barberi, Corona, CA (US); Keith W. Kilham, Corona, CA (US)

(73) Assignee: AGT-USA, Inc., Corona, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/906,695

(22) Filed: Oct. 4, 2024

(65) Prior Publication Data

US 2026/0115764 A1 Apr. 30, 2026

Related U.S. Application Data

(63) Continuation of application No. 18/414,243, filed on Jan. 16, 2024, now Pat. No. 12,109,592, which is a continuation of application No. 18/473,085, filed on Sep. 22, 2023, now Pat. No. 11,872,593, which is a continuation-in-part of application No. 18/137,988, filed on Apr. 21, 2023, now Pat. No. 11,766,678.

(51) Int. Cl.

| | |
|---|---|
| ***B07B 1/46*** | (2006.01) |
| ***B02C 23/10*** | (2006.01) |
| ***B07B 1/28*** | (2006.01) |

(52) U.S. Cl.

CPC ................ *B07B 1/46* (2013.01); *B02C 23/10* (2013.01); *B07B 1/28* (2013.01); *B07B 2201/04* (2013.01)

(58) Field of Classification Search

CPC .... B07B 1/28; B07B 1/30; B07B 1/34; B07B 1/40; B07B 1/46; B07B 2201/04; B02C 23/10; B03B 1/00

USPC ............................................ 241/23; 209/311

See application file for complete search history.

(56) References Cited

U.S. PATENT DOCUMENTS 10,864,525 B1 * 12/2020 Barone .................. B03B 11/00
11,766,678 B1 9/2023 Barberi et al.
(Continued)

FOREIGN PATENT DOCUMENTS

DE 10013942 10/2001
DE 10013942 A1 * 10/2001 .............. A61K 9/14
(Continued)

OTHER PUBLICATIONS

DE10013942—translation (Year: 2000).*
EP0317935—translation (Year: 1988).*

*Primary Examiner* — Terrell H Matthews

(74) *Attorney, Agent, or Firm* — Crockett & Crockett, PC; K. David Crockett, Esq.

(57) ABSTRACT

Devices and methods for improved separation of small particles from other stock. The device includes a sifting tray assembly and means for vibrating the screen of the sifting tray assembly for separating components and a cryogenic fluid source and injection system for freezing the small parts to the point where they are solid enough to pass through the screen without adhering to the screen. The method entails use of the system to separate small particles in sifting trays while spraying the stock with a cryogen such as liquid nitrogen.

15 Claims, 5 Drawing Sheets

(56) References Cited

U.S. PATENT DOCUMENTS

| | | | | |
|---|---|---|---|---|
| 11,872,593 | B1 * | 1/2024 | Barberi | B07B 1/46 |
| 12,109,592 | B1 * | 10/2024 | Barberi | B07B 13/16 |
| 2020/0030397 | A1 * | 1/2020 | Himes | A61K 36/3482 |
| 2021/0363462 | A1 * | 11/2021 | Castellanos | B01D 11/0207 |

FOREIGN PATENT DOCUMENTS

| | | | | |
|---|---|---|---|---|
| EP | 0317935 | | 5/1989 | |
| EP | 0317935 | A2 * | 5/1989 | B02C 13/14 |
| EP | 4161701 | | 4/2023 | |
| WO | WO2021248041 | | 12/2021 | |

* cited by examiner

CRYOGENIC PROCESSING SYSTEM FOR PLANT MATERIAL

This application is a continuation of U.S. application Ser. No. 18/414,243, filed Jan. 16, 2024, which is a continuation of U.S. application Ser. No. 18/473,085, filed Sep. 22, 2023, now U.S. Pat. No. 11,872,593, which is a continuation-in-part of U.S. application Ser. No. 18/137,988, filed Apr. 21, 2023, now U.S. Pat. No. 11,766,678, the entirety of which is incorporated by reference.

FIELD OF THE INVENTIONS

The inventions described below relate to the field of cryogenic separation of plant stock.

BACKGROUND OF THE INVENTIONS

Cryogenic separation is used to separate and collect small particles from plants. These small particles might include pharmaceutical compounds, flavoring compounds or other compounds. For example, trichomes with essential oils from plants such as *salvia*, lupulin glands from hops for beer, THC-rich trichomes from marijuana, or CBD-rich trichomes from hemp may all be harvested with the aid of cryogenic separation. The technique involves cooling plant stock to cryogenic temperatures to solidify the small particles (so they are not sticky) and then sifting the plant stock to separate the small particles from the remainder of the plant stock.

Barone, et al., System and Method for Cryogenic Separation, U.S. Pat. No. 10,864,525 (Dec. 15, 2020) and Castellanos, Agitator For Solventless Extraction Of *Cannabis* Essential Oils, U.S. Pub. 2021/0363462 (Nov. 25, 2021) both proposed a system for separating *cannabis* trichomes from stalks, stems and flowers by immersing and chilling the plant stock with cold liquid (liquid nitrogen or water, respectively) followed by agitation of the immersed plant stock to separate trichomes from the remainder of the plant stock.

SUMMARY

The devices and methods described below provide for improved separation of small particles from other stock, in particular, for separating small parts of plants such as trichomes from the leaves, flowers, branches, stems or other parts of the plant. The device includes a sifting screen and means for vibrating the screen for separating components and cryogenic fluid source and injection system for freezing the small parts to the point where they are solid enough to pass through the screen without adhering to the screen. The system is preferably configured to provide filtering in a continuous process, rather than a batch process. The system may include several layers of sifting trays, with cryogenic fluid sprayers configured to inject cryogenic fluid onto the stock in the sifting trays, and each pan may have an outlet for allowing particles that are too large to pass through the screen to exit the pan. The small particles that drop through the first sifting tray may be collected for storage, or collected in a second filter pan located below the first pan for further sifting, and so on, until particles of the desired size are collected from a sifting tray, and particles of larger size have been separated and retained in higher sifting trays, and particles of lower size (if any) are passed to a lower sifting tray and thus separated from the particles of the desired size. The sifting tray assemblies are preferably modular, and configured for easy insertion into a rack (and removal from the rack), with one above the other, and the outlet (of stock passing through the sifting screen) disposed above the inlet of a succeeding sifting tray assembly. This provides a compact configuration and allows easy removal of sifting tray assemblies for cleaning or change-out of the sifting screens to suit stock of different sizes.

The system can be used with new or prior art feed systems, including a hopper for collecting stock, a conveyer for conveying stock to the sifting tower, a mill or grinder system for reducing the stock to small pieces, including physically breaking the particles of interest from the stock, for deposit into the sifting tower, and optionally a mill for breaking the stock into pieces sized for transport via the conveyor to the sifting components, which may be located between the hopper and the conveyer.

In addition to the particle separation system, the devices and method disclosed below provide for collection of gaseous cryogen (which may be formed from evaporation of liquid cryogen, or an injected gaseous cryogen) and any entrained very fine small particles that may be created in the process pathway from the hoppers, mill, conveyor, sifting tray assembles. The fine particles may be valuable plant components. A vapor exhaust and fine particle filter system includes a pump or pumps drawing gaseous cryogen and any entrained very fine small particles from the system, which might otherwise escape the system, from one or more locations in the process pathway and passes the gaseous cryogen and entrained fine particles into a filter, such as a bag filter or cyclone separator.

DETAILED DESCRIPTION OF THE INVENTIONS

Figure 1:
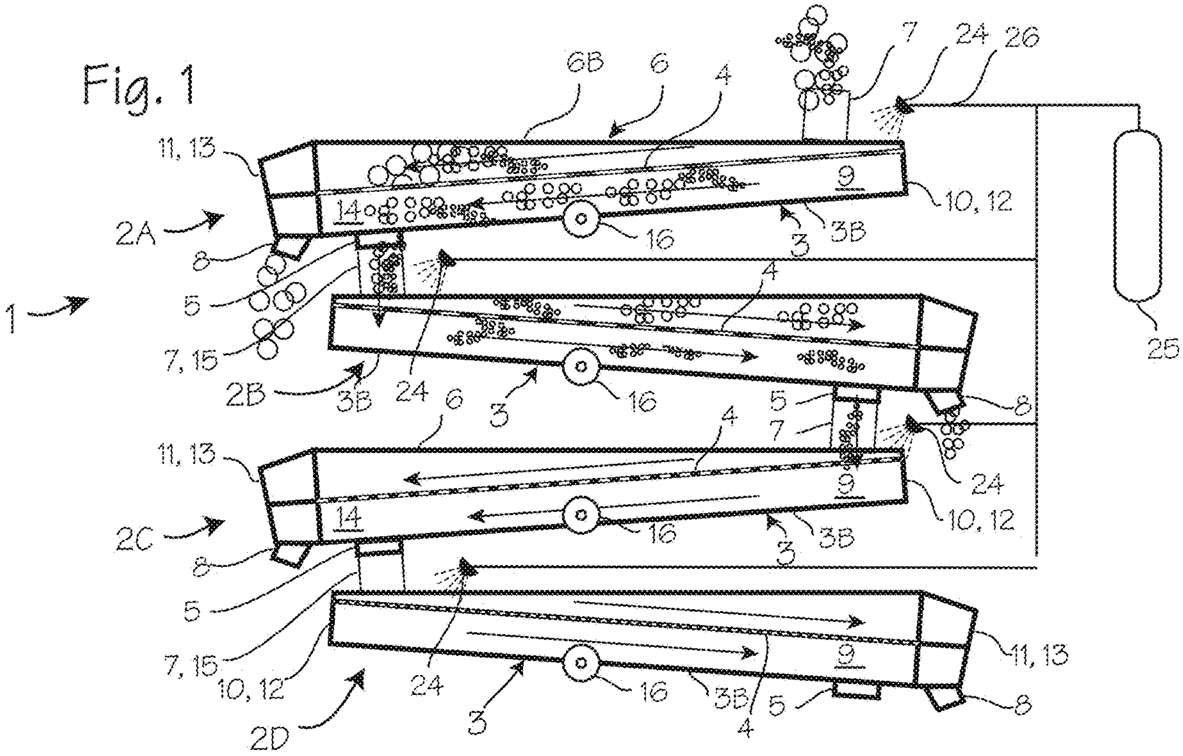
FIG. 1 illustrates a sifting system for separating trichomes, glands or other tiny components from plant stock, in a fan-fold arrangement.
Figure 2:
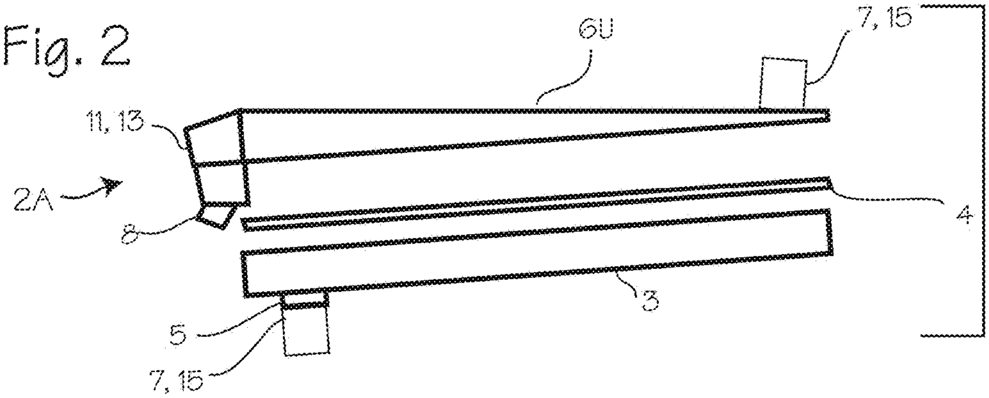
FIG. 2 is an exploded view of a sifting pan assembly of FIG. 1.

FIG. 1 illustrates a sifting system for separating trichomes, glands or other tiny components from plant stock. The sifting system 1 includes one or more sifting tray assemblies 2A, 2B, 2C, 2D and 2D. As shown in FIG. 2, each sifting tray assembly includes a bottom pan 3 with a top open to a sifting screen 4 which disposed above proximate the top of the bottom pan. The bottom pan has a bottom 3B with a closed surface, meaning that it is either solid with no perforations, or perforated with perforations too small to allow small particles to pass through. The bottom pan 3 includes a sifted small particle outlet 5 located at one end of the pan bottom. Sifted particles, having fallen through the sifting screen, may be moved toward the end of the bottom pan with the sifted particle outlet for collection or deposit into a lower sifting tray. The sifting screens 4 are configured with apertures that allow small particles to fall through the apertures without allowing larger particles to fall through the apertures. Each sifting tray assembly includes an upper enclosure 6 with an open bottom and, preferably, a closed top surface 6U with an inlet aperture 7 located at a first, inlet end of the enclosure and a large particle outlet aperture 8 located at a second, outlet end of the upper enclosure (in this embodiment, on the same end as the small particle outlet 5) (the top surface, if closed, is either solid with no perforations, or perforated with perforations too small to allow small particles to pass through). The combined upper enclosure and bottom pan and sifting screen form a sifting tray assembly with side walls 9, a first end wall 10 (the inlet end) and a second end wall 11 (the outlet end), with the small and large particle outlet apertures 5 and 8 proximate the second end wall. The large particle outlet aperture 8 is disposed proximate the outlet end to provide an outlet for large particles trapped above the filter screen, and the small particle outlet aperture 5 disposed below the sifting screen to provide an outlet for small sifted particles. The large particle outlet aperture 8 is sized to allow exit of larger particles that have not fallen through the sifting screen 4, while the small particle outlet aperture 5 is sized to allow exit of small particles that have passed through the sifting screen. When assembled in a stack of sifting tray assemblies, each sifting tray assembly is preferably inclined, with the inlet end 12 of the upper enclosure disposed higher than the outlet end 13 of the upper enclosure and outlet end 14 of the bottom enclosure. In particular, the sifting screen 4 of each sifting tray assembly 2 is inclined, with a first end (near the inlet aperture) disposed higher than the second end (near the outlet apertures).

The small particle outlet aperture is preferably connected to the inlet end and inlet aperture 7 of the next lower sifting pan assembly through tubes 15. A first end of the sifting screen is proximate the first end 12 of the upper enclosure and the second end of the sifting screen is proximate the second, outlet end 13 of the upper enclosure.

For each of the plurality of sifting tray assemblies 2 in FIG. 1, the upper enclosure 6 preferably has a closed top surface 6U and is secured to the bottom pan 3 to form an enclosed space, excepting the inlet aperture 7, small particle outlet aperture 5 and large particle outlet aperture 8, with the sifting screen disposed between the upper enclosure 6 and the bottom pan 3.

The system includes one or more vibratory motors 16 for rapidly vibrating the sifting tray or pans. Preferably, each sifting tray assembly has at least one vibratory motor associated with it, operatively connected to the sifting tray assembly so as to impart vibration to the sifting tray assembly. Where multiple sifting trays are used, they may be stacked, as shown, with a first sifting tray disposed directly above a second sifting tray, which in turn is disposed directly above a third sifting tray, and so on for any number of sifting trays.

Figure 3:
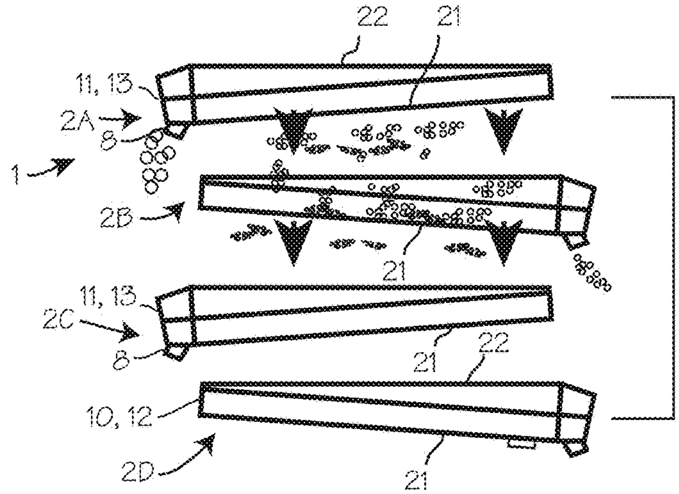
FIG. 3 illustrates a sifting system for separating trichomes, glands or other tiny components from plant stock, configured with a bottom screen of each sifting tray assembly open to a lower, sifting tray assembly in a fan-fold arrangement.

In an alternative configuration, the sifting tray assemblies may be configured as shown in FIG. 3, where the bottom pan of each sifting tray assembly includes a pan bottom 21 comprising a sifting screen 4 configured with apertures that allow small particles to fall through the apertures without allowing larger particles to fall through the apertures. In this sifting tray assembly, the top 22 is open. This embodiment does not include a discrete small particle outlet 5, as small particles passing through the sifting screen pass directly into the next lower sifting tray. Each pan includes side walls 9, a first end wall 10 and a second end wall 11, with a large particle outlet aperture 5 on the second end wall. The large particle outlet aperture 5 is sized to allow exit of larger particles that have not fallen through the sifting screen 4.

When assembled in a stack of filter pans as shown in FIG. 1 or 3, each pan is preferably inclined, with the inlet end 12 of the filter screen disposed higher than the outlet end 13 of the filter screen. Where multiple sifting trays are used, they may be stacked, as shown, with a first sifting tray disposed directly above a second sifting tray, which in turn is disposed directly above a third sifting tray, and so on for any number of sifting trays.

Cryogen injectors 24, configured to introduce a cryogenic fluid into the sifting trays, are located in each sifting tray at a location that permits injection (dousing, spraying, or bathing) of plant stock with the cryogen. As depicted, the injectors are located proximate the high end of the inclined sifting tray (in some embodiments, the inlet end of the sifting tray) of each sifting tray assembly, and additional injectors may be disposed along the length of each sifting tray, in the middle of the pan or near the outlet aperture for unwanted larger particles and outlet aperture for smaller particles. The cryogen injectors are connected in fluid communication with the cryogen reservoir 25 through cryogen supply lines 26.

The system shown in FIG. 1 includes five sifting trays, with a first sifting tray 2A having a first inlet side, with the bottom (the sifting screen) inclined downwardly from the inlet end to the outlet side, with the screen bottom disposed over a second sifting tray 2B, which is also configured with a first inlet end, with the bottom (the sifting screen) inclined downwardly from the inlet end to the outlet side, with the screen bottom disposed over the third sifting tray 2C. The stack may include any number of sifting trays, depending on the number of sifting steps needed to obtain particles of a desired size. The pans may be arranged in a fan-fold arrangement, as shown. The pans are shown in a vertical stack, with each pan disposed directly above a subsequent stack, with a first pan inclined downwardly toward a first side and large particle outlet aperture 8 and the small particle outlet aperture 5, the next lower pan inclined downwardly toward a second side different from the first side (preferably opposite the first side, and the next lower pan inclined to a third side (preferably back to the first side) and its associated large particle outlet aperture 8 and the small particle outlet aperture 5, and so on, for as many pans as are necessary to obtain the desired level of separation. This configuration may be employed with the filter pan assemblies of FIG. 1 or 3.

Figure 4:
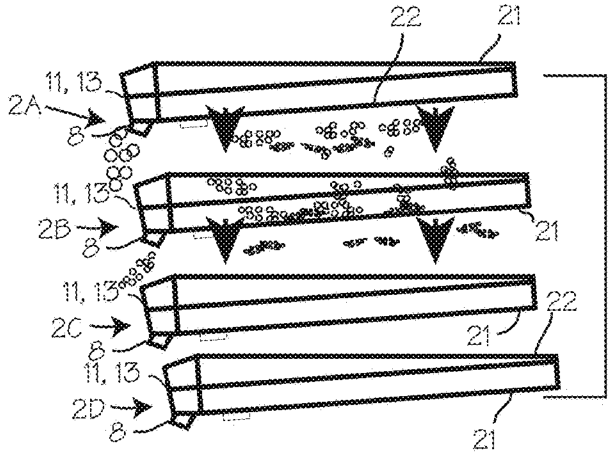
FIG. 4 illustrates a sifting system for separating trichomes, glands or other tiny components from plant stock in an alternative configuration.
Figure 5:
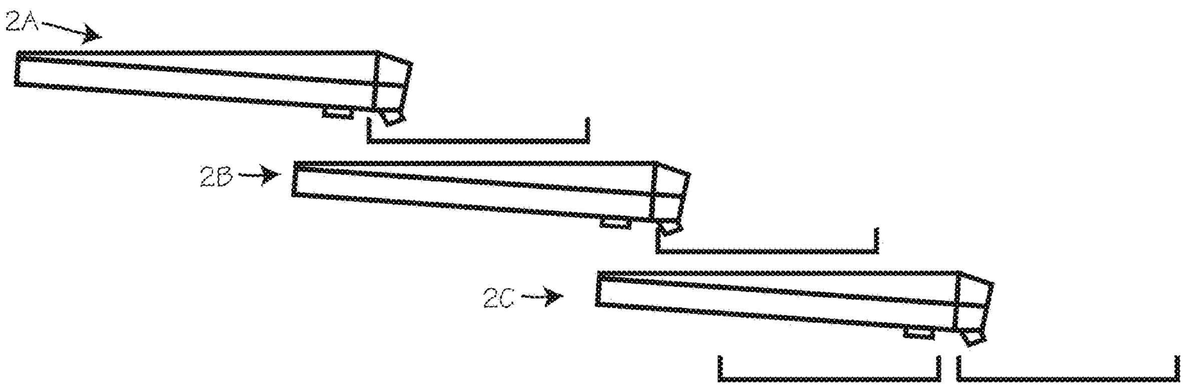
FIG. 5 illustrates an alternative arrangement for the sifting tray assemblies of FIG. 1.

The several sifting trays configured as in FIG. 3, in which small particles pass through the bottom screen into a lower sifter pan assembly, may also be arranged with the large particle outlets of each pan on the same side of the stack, as shown in FIG. 4. Also, the several sifting trays may also be arranged with the sifting screen 4 parallel to the ground (not inclined) if other means are provided to remove large particles that do not fall through the screen bottom from the pan. The several sifting trays may be arranged as in FIG. 5, with the sifting trays displaced horizontally, and not disposed one over another, with the small particle outlet of one sifting tray disposed over the inlet side of a successive sifting tray assembly.

The pans may be arranged otherwise, with one higher than the next but displaced horizontally, for processing plant stock in which the smaller particles that fall through each sifting tray are not to be collected (for example, small seed may be the desired component, while trichomes or other smaller components are unwanted). Also, the sifting trays assemblies of FIG. 1 may be modified, with the pan bottoms 3 inclined opposite the sifting screens, such that the pan bottoms are inclined downwardly away from the lower end of the sifting screens, in which case the small particle outlet apertures 5 will be above the inlet ends of lower sifting tray assemblies which are arranged with inlet ends on one side of the stack, and large particle outlet apertures 5 all on the other end of the stack.

The small particle outlet aperture (FIG. 1) or bottom filter screen 4 (FIG. 3) serve as outlets for small particles, which may be the particles desired for collection or particles desired for disposal. The large particle outlet aperture 5 serves as an outlet for larger particles, which may be particles desired for collection or particles desired for disposal. Typically, when processing plant material, the desired particles are small plant components such as trichomes and lupulins, which pass through the bottom filter with other smaller components until the desired particles are the major constituent of the contents of a pan, and the undesired particles are larger components such as stems, leaves and flower buds, though in some circumstances this may be reversed.

The sifting screen may comprise a wire mesh, a grate or perforated sheet of material, where interstices of the mesh, or apertures or perforations of the sheet are sized to allow particles of a desired size to fall through the screen.

Figure 6:
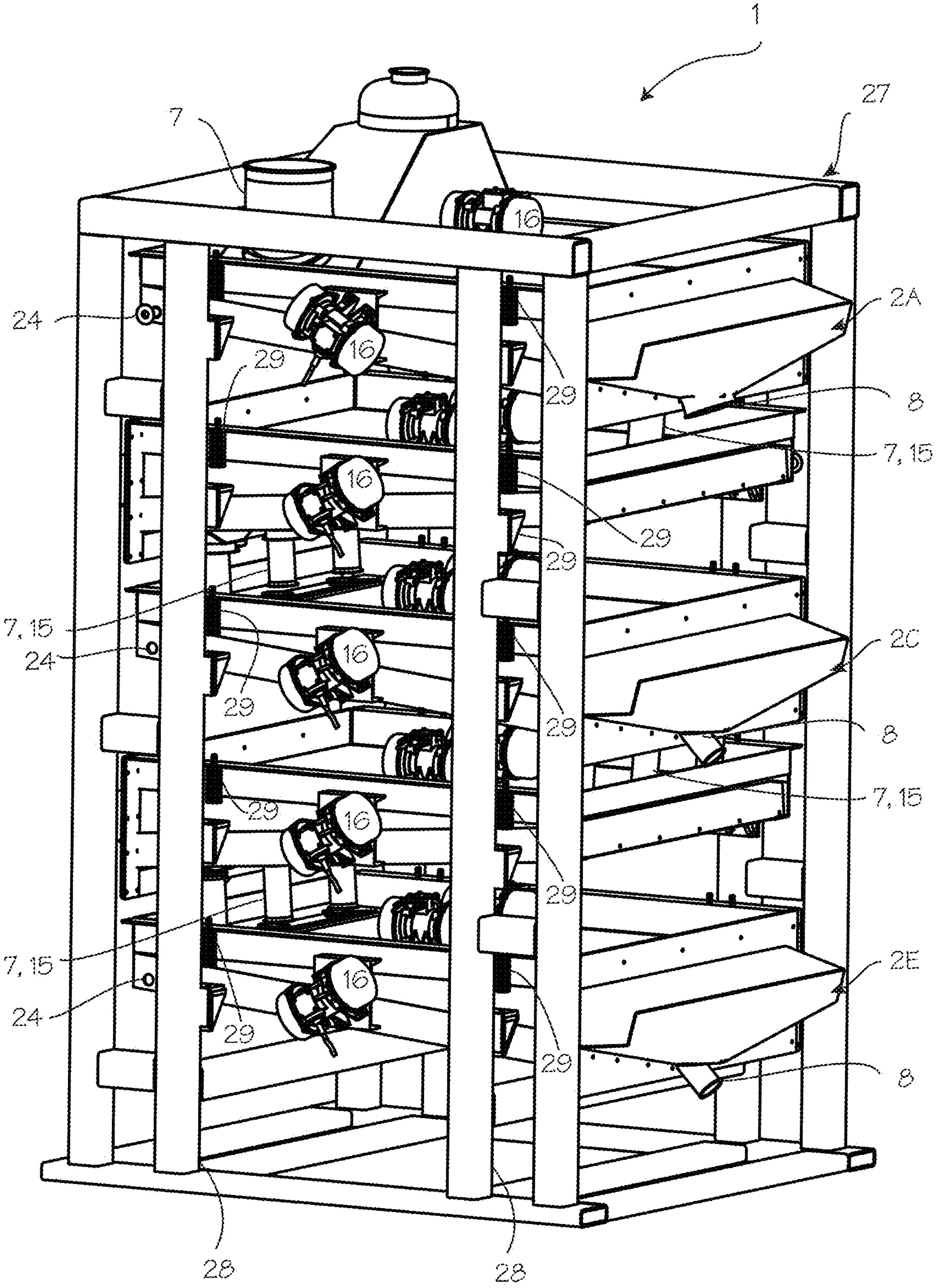
FIG. 6 is an illustration of a prototype sifting system corresponding to FIG. 1.

FIG. 6 is an illustration of a prototype sifting system corresponding to FIG. 1, showing the several sifting tray assemblies 2A, 2B, 2C, 2D and 2E within a rack 27. The rack comprises various supports 28, which may be frame members as shown, or the walls of an enclosure, along with various assembly supports 29 which support the sifting tray assemblies. Preferably, the assembly supports and sifting tray assemblies are configured so that the trays may be readily removed from the rack or placed into the rack, for example by sliding a sifting tray assembly into and out of the rack on drawer slides engaging the side of the upper enclosure. This system is modular, meaning that any one of the sifting assemblies can be readily removed from the rack, and new sifting assemblies may be inserted in place of removed sifting assemblies. Removal and replacement may be necessary, for example, for cleaning, or to substitute a tray for a different tray with a different sifting screen more suitable to a particular plant stock or separation process. For the open-bottom sifting assemblies of FIG. 3, it may be preferable to enclose the sifting trays in a closed cabinet to retain dust and debris and desired small particles within the cabinet, in which case the frame may comprise walls of the cabinet or rails within the cabinet.

Sifting tray assemblies in the rack include numerous vibratory motors 16, the large particle outlets 8 and small particle outlets 5, arranged in the fan-fold arrangement in which the several filter pan assemblies are arranged in a vertical stack, with the outlet apertures of each filter pan assembly positioned over the inlet side of the successive filter pan assembly. The tubes 15 which connect the outlet aperture of each sifting tray assembly to the inlet aperture 7 of the next lower sifting tray assembly (except for the lowest sifting tray assembly). Tubes or bins may be placed to receive the output of the large particle outlet apertures 8 which communicate with the upper enclosures which contain particles trapped above the sifting screen of each assembly. Cryogen supply lines 26 communicate with the cryogen injectors (the cryogen injectors are enclosed within the assemblies).

Figure 7:
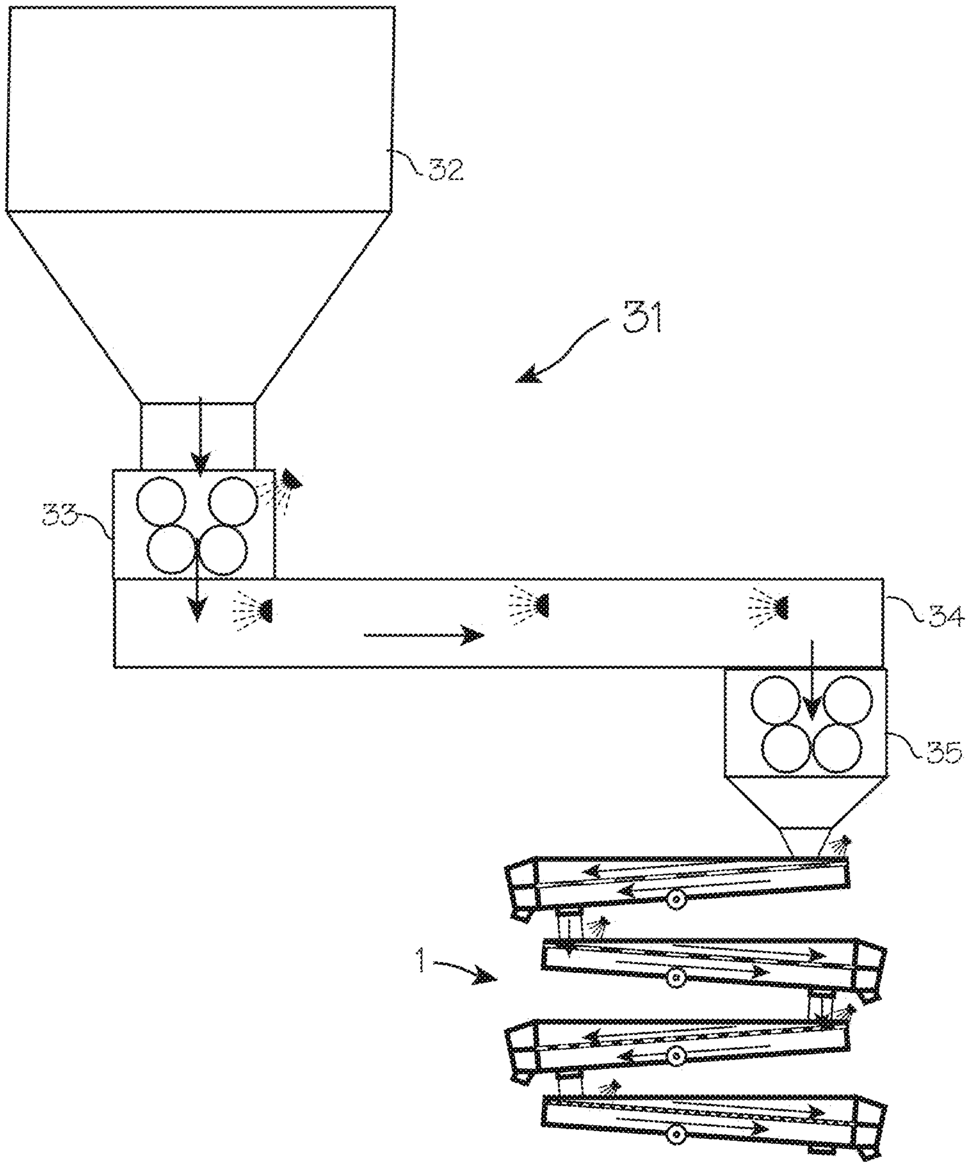
FIG. 7 illustrates a cryogenic separation system including the sifting system of FIG. 1.

FIG. 7 illustrates a cryogenic separation system 31 which includes the sifting system 1, which may be any of the several versions depicted in the earlier figures. The remainder of the system includes a hopper 32 which feeds plant stock into a first mill 33, which in turn feeds milled plant stock into a conveyor 34, which conveys the milled plant stock to the first sifting tray of the sifting tower. A second mill 35 between the conveyor and the sifting tower 1 may be used to further mill the stock before deposit onto the sifting screen of the first sifting tray in the tower. The first mill is configured to break down plant stock into components sized for transport through the conveyer, and may be optional depending on the plant size. The second mill, which may also be optional, is configured to mill plant stock into components for filtering and sifting in the sifting trays. Various cryogen sprayers are provided along the stock pathway, and may be placed to supply cryogen spray to the first mill, along the conveyer, and the second mill, in addition to the cryogen supplies to the sifting tray assembly.

In use, a user processing near the point of harvest, having provided the system of FIG. 7 including the sifting system of one of FIGS. 1 through 6, will deposit plant stock which may include entire plants, stems, stalks, leaves, flowers, etc. which have some form of trichome on one or more of these components into the hopper, optionally pre-mill the plant stock in the first mill, transport the stock through the conveyor while exposing the plant stock to the cryogen (spraying the cryogen or washing cryogen over the plant stock), deposit the plant stock into the second mill preferably also exposing the plant stock to the cryogen (spraying the cryogen or washing cryogen over the plant stock), and deposit the milled plant stock into the first sifting tray assembly, and vibrate the sifting tray assemblies to (1) separate small particles from the larger particle of the plant stock in the first tray, and (2) cause or facilitate movement of the larger plant stock downwardly, over the sifting screen and within the upper enclosure 6 and toward the large particle outlet aperture 8, and cause or facilitate movement of the smaller plant stock downwardly within the pan bottom 3 toward the small particle outlet aperture 5, and spray cryogen over the plant stock within the sifting tray assemblies, or within the inlet or outlet tube 15 (at least one of these locations) while vibrating and moving the stock toward the outlet apertures. Preferably, the method entails passing the separated small particles from a first sifting tray assembly through to the inlet of a second sifting tray assembly, and so on, for sifting operations through as many sifting tray assemblies as necessary to separate particles of the desired size, and collecting particles of the desired size from a last small particle outlet aperture (if the last sift provides the desired small particles without unwanted smaller particles) or collecting particles of the desired size from a last large particle outlet aperture (if the last sift provides the desired small particles in the upper enclosure and sifts undesired even smaller small particles through the sifting screen).

Operation of the system may result in escape of gaseous nitrogen and entrained fine particles (which may be small particles and even smaller, dust-like particles, for example fragments of desired trichomes, that are small enough to become entrained in the flow of gaseous cryogen) from the various joints and outlets of the system. The continuous injection of liquid nitrogen and its subsequent evaporation may otherwise result in overpressure of nitrogen gas within the sifting tray assemblies, inlets, outlets (and the remainder of the process pathway, including outflow tubes to collection barrels and the collection barrels) and escape of gaseous nitrogen throughout the system. Very small particles of the desired trichomes or other small particles can be entrained in the escaping gas. To prevent build-up of gaseous nitrogen and dust in the area around the system, and recover any entrained fine particles, the system may include a vapor exhaust and fine particle recovery system.

Figure 8:
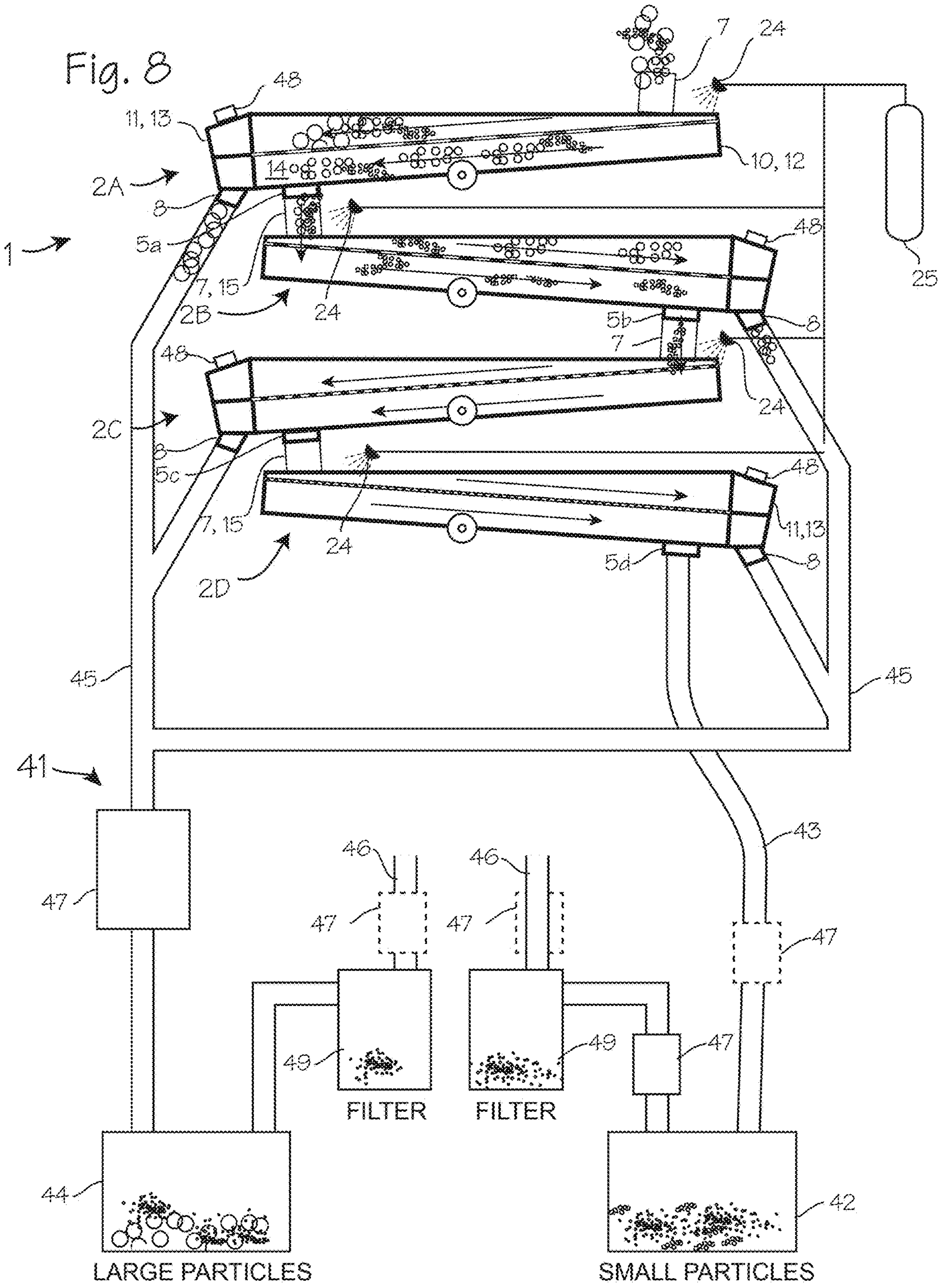
FIG. 8 illustrates an adjunct subsystem to the system of the previous figures, for recovery of gaseous nitrogen and very fine trichome particles entrained in gaseous nitrogen.

FIG. 8 illustrates a vapor exhaust and fine particle filter system 41 for use with the separation system of the previous figures, for recovery of gaseous nitrogen and very fine trichome particles entrained in gaseous nitrogen. The sifting system 1 of FIG. 8 includes the components shown in FIG. 1, including the several sifting tray assemblies 2A, 2B, 2C, and 2D, and inlet tubes 7, small particle outlets 5 and small particle inlets 7, 15, and large particle outlets 8, the several cryogen injectors 24. Completing the system, the final small particle outlet 5*d* at the bottom of the final sifting tray assembly 2D is connected to a small particle collection container 42 through outlet tube 43. The large particle outlets 8 are connected to large particle collection containers 44 through outlet tubes 45. The containers may be closed containers (not necessarily gas-impermeable), or sealed gas-impermeable container, excepting vents 46, or open containers (in embodiments in which the filter means is upstream of the containers).

To prevent build-up of gaseous nitrogen and dust in the area around the system, and recover any entrained fine particles, the system includes a vapor exhaust and fine particle recovery system comprising a pump 47 for withdrawing gaseous nitrogen from various points in the system and a fine particle separation/filter system. The system includes various gas recovery outlets 48, corresponding gas recovery hoses connected to the various gas outlets, and at least one vacuum source or pump in fluid communication with the gas outlets, containers 42, 44, the recovery hoses 45, the vents 46 or other point in the system. In FIG. 8, various alternative locations of the pump 47 are illustrated in phantom.

The pump is operable to force evaporated cryogen through the hoses and into a secondary particle separator(s) 49 which are operable to separate entrained small particles from the recovered gaseous cryogen, collect those small particles and pass the purified gaseous cryogen to atmosphere.

The pump, which may be a blower, venturi pump or other means for drawing gaseous nitrogen from the sifting tray assemblies, the containers 42, 44 or elsewhere in the system, may be disposed, in fluid communication with the system, in line with the large particle outlet tubes 45 and the small particle outlet tube 43, in line with the vents 46, or in fluid communication with the sifting tray assemblies through, for example, gas recovery outlets 48, and the outlet of the blower, venturi pump or other means for drawing gaseous nitrogen is in fluid communication with the container, is in fluid communication with the separator (unless it is disposed in line with the vent(s) 46). The vacuum source or pump 50 is preferably configured to maintain pressure within the system at a neutral pressure, preferably at ambient pressure (the same pressure as the atmosphere surrounding the cryogenic processing system) or a slight negative pressure, keeping pressure within the particle separation system in the range of (1) a pressure substantially equal to ambient pressure to (2) a pressure about 6895 Pa (1 psi/52 mmHg) less than ambient pressure (so, if ambient pressure is standard atmospheric pressure of 101,325 Pa (14.7 psi/760.2 mmHg), the low end of the range would be about 94458.17 Pa (13.7 psi/708.5 mmHg).

The secondary particle separator(s) 49 may be a bag filter, a cartridge filter, cyclone separator, a sedimenter, an electronic precipitator, or any other filter means for filtering the entrained small particles from the gaseous cryogen.

In use, the system may be operated by feeding plant stock into the mill 35 (preferably after insertion into the hopper 32, passing the plant stock through a first mill 33 and conveyer 34), and into a succession of particle separators (at least one, preferably the sifting trays shown in the figures), and operating the particle separators to separate desired small particles such as the trichomes of plant stock from larger components of the plant stock, and collecting the separated small particles, and injecting liquid cryogen to wet the plant stock with liquid cryogen at one or more points along the process pathway. Additionally, the method may accompanied by steps including evacuation of evaporated cryogen and any entrained small particles from the system, even while liquid cryogen is being injected into the system, pumping the evaporated cryogen with the entrained small particles through a separator to remove entrained particles from the evaporated cryogen. The method may also include a step of harvesting the entrained particles for use or disposal.

Thus, the method of separating small particles from plant stock may use the particle separation system comprising a grinding mill with an outlet to a sifting tray assembly, where the sifting tray assembly comprising (a) an inlet end with an inlet for large particles and small particles, (b) a means for separating the large particles from the small particles, (c) an outlet end with an outlet for discharge of the large particles and an outlet for discharge of small particles, (d) a first container in communication with the outlet for discharge of the large particles for collection of the large particles and (e) a second container in communication with the outlet for discharge of the small particles for collection of the small particles. The method includes passing large particles and small particles through the grinding mill and into the sifting tray assemblies; injecting a cryogen at cryogenic temperature into the particle separation system, including the mill, the sifting tray assemblies, and even a conveyor used to deliver plant stock, to cool the plant stock to cryogenic temperatures to solidify the small particles, and operating the sifting tray assembly to separate the small particles from the large particles, and thereafter passing the large particles to a first container and passing the small particles to a second container or a second sifting tray assembly. After injection, the cryogen, if liquid, will evaporate to a gaseous cryogen, or, if gaseous, remain gaseous and the method includes drawing the gaseous cryogen from the particle separation system with a first pump and operating the first pump to force the gaseous cryogen through a filter means to remove any small particles entrained in the gaseous cryogen drawn from the particle separation system. The pump may be operated to maintain vapor pressure within the particle separation system at a pressure substantially equal to ambient pressure, or slightly negative pressure to limit escape of extremely fine small particles entrained in the gaseous cryogen.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A method of separating small particles from plant stock, wherein said plant stock comprises large particles and small particles, said method comprising the steps of:

providing a particle separation system comprising a sifting tray assembly comprising (a) an inlet end with an inlet for large particles and small particles, (b) a means for separating the large particles from the small particles, (c) an outlet end with an outlet for discharge of the large particles and an outlet for discharge of small particles, (d) a first container in communication with the outlet for discharge of the large particles for collection of the large particles and (e) a second container in communication with the outlet for discharge of the small particles;

passing large particles and small particles into the sifting tray assembly;

injecting a cryogen at cryogenic temperature into the particle separation system to cool the plant stock to cryogenic temperatures to solidify the small particles, wherein, at least after injection, the cryogen comprises a gaseous cryogen;

operating the sifting tray assembly to separate the small particles from the large particles;

passing the large particles to the first container and passing the small particles to a second container; and drawing the gaseous cryogen from the particle separation system with a first pump; and operating the first pump to force the gaseous cryogen through a filter means to remove any small particles entrained in the gaseous cryogen drawn from the particle separation system.

2. The method of claim 1 further comprising the step of:

operating the first pump to maintain vapor pressure within the particle separation system in the range of (1) a pressure substantially equal to ambient pressure to (2) a pressure 6895 Pa (1 psi/52 mmHg) less than ambient pressure.

3. The method of claim 1 wherein:

the filter means comprises a bag filter, a cartridge filter, cyclone separator, a sedimenter, or an electronic precipitator.

4. The method of claim 1 wherein:

the first container is a closed container with a first vent communicating from the first container to ambient atmosphere and the second container is a closed container with a second vent communicating from the second container to ambient atmosphere;

the first pump is disposed in the first vent; and the particle separation system further comprises a second pump disposed in the second vent.

5. The method of claim 1 wherein:

a first pump is disposed with a first pump inlet communicating with a large particle outlet aperture of the sifting tray and a first pump outlet communicating with the first container.

6. The method of claim 1 wherein:

the first pump is disposed with a first pump inlet communicating with the small particle outlet aperture of the sifting tray and a first pump outlet communicating with the second container.

7. The method of claim 1, wherein:

the step of injecting a cryogen is accomplished by injecting cryogen at the inlet end of the sifting tray assembly; and the step of drawing the gaseous cryogen from the particle separation system is accomplished by drawing gaseous cryogen through a port at the outlet end of the sifting tray assembly.

8. The method of claim 1, wherein plant stock is hops, and the method is used to separate lupulins from other components of hops.

9. The method of claim 1, wherein plant stock is *salvia*, and the method is used to separate essential oils from other components of *salvia.*

10. The method of claim 1, wherein plant stock is *cannabis*, and the method is used to separate trichomes from other components of *cannabis.*

11. A method of separating small components from larger components of plant stock comprising, said method comprising:

providing a sifting system for separating small components from larger components of plant stock comprising;

a plurality of sifting tray assemblies, including at least a first sifting tray assembly and a second sifting tray assembly, wherein each sifting tray assembly comprises:

an upper enclosure with an inlet aperture located at a first, inlet end of the upper enclosure, and a large particle outlet aperture located at a second, outlet end of the upper enclosure;

a sifting screen below the upper enclosure a cryogen injector disposed proximate the first end of the upper enclosure, said cryogen injector configured to supply a cryogenic fluid to plant stock entering the upper enclosure 6;

a bottom pan with a first end and a small particle outlet aperture located at a second end of the bottom pan, and a top open to the sifting screen, and a bottom with a closed surface;

wherein the sifting screen is disposed between the upper enclosure 6 and bottom pan;

a filter system in fluid communication with the sifting system, said filter system comprising:

a first pump for drawing cryogenic fluid from the sifting system;

a filter for filtering any small particles entrained in the cryogenic fluid drawn from the sifting system and forced through the filter by the first pump;

and performing the steps of:

depositing plant stock into a first sifting tray assembly, through the upper enclosure with an inlet aperture located at a first, inlet end; and vibrating the first sifting tray assembly to (1) separate a first population of small particles from the larger particle of the plant stock in the first tray, and (2) cause or facilitate movement of the larger plant stock particles downwardly, over the sifting screen and within the upper enclosure and toward the large particle outlet aperture of the first sifting tray assembly, and (3) cause or facilitate movement of a first population of small particles downwardly within the pan bottom of the first sifting tray assembly toward the small particle outlet aperture of the first sifting tray assembly, and spraying cryogen, using a cryogen injector of the first sifting tray assembly, over the plant stock within the first sifting tray assembly, or within the inlet or outlet tube of the first sifting tray assembly while vibrating and moving the stock toward the outlet apertures of the first sifting tray assembly, passing the first population of small particles from the first sifting tray assembly to a second sifting tray assembly;

vibrating the second sifting tray assembly to (1) separate a second population of small particles from the first population of small particles in the second sifting tray assembly, and (2) cause or facilitate movement of the larger plant stock particles downwardly, over the sifting screen and within the upper enclosure and toward the large particle outlet aperture of the second sifting tray assembly, and (3) cause or facilitate movement of a second population of small particles downwardly within the bottom pan of the second sifting tray assembly toward the small particle outlet aperture of the second sifting tray assembly, and spraying cryogen, using a cryogen injector of the second sifting tray assembly, over the plant stock within the second sifting tray assembly, or within the inlet or outlet tube of the second sifting tray assembly while vibrating and moving the stock toward the outlet apertures of the second sifting tray assembly, passing the second population of small particles from the second sifting tray assembly;

drawing the gaseous cryogen from the sifting system with a first pump; and operating the first pump to force the gaseous cryogen through the filter to remove any small particles entrained in the gaseous cryogen drawn from the sifting system.

12. The method of claim 11 further comprising the steps of:

passing the separated small particles from a first sifting tray assembly through to the inlet of a second sifting tray assembly, and so on, for sifting operations through as many sifting tray assemblies as necessary to separate particles of the desired size, and collecting particles of the desired sized from a last small particle outlet aperture (if the last sift provides the desired small particles without unwanted smaller particles) or collecting particles of the desired sized from a last large particle outlet aperture (if the last sift provides the desired small particles in the upper enclosure and sifts undesired even smaller small particles through the sifting screen).

13. The method of claim 11, wherein plant stock is hops, and the method is used to separate lupulins from other components of hops.

14. The method of claim 11, wherein plant stock is *salvia*, and the method is used to separate essential oils from other components of *salvia*.

15. The method of claim 11, wherein plant stock is *cannabis*, and the method is used to separate trichomes from other components of *cannabis*.

* * * * *